Nov. 23, 1937.   E. P. FLOYD ET AL   2,099,729
PATTERN CONTROL AND SHEDDING MECHANISM FOR LOOMS
Filed Sept. 10, 1934   10 Sheets—Sheet 1

Eugene P. Floyd
and
Arthur G. Hackney
Inventors

Nov. 23, 1937.  E. P. FLOYD ET AL  2,099,729
PATTERN CONTROL AND SHEDDING MECHANISM FOR LOOMS
Filed Sept. 10, 1934   10 Sheets-Sheet 2

Inventors:
EUGENE P. FLOYD
AND
ARTHUR G. HACKNEY
By
Attorney

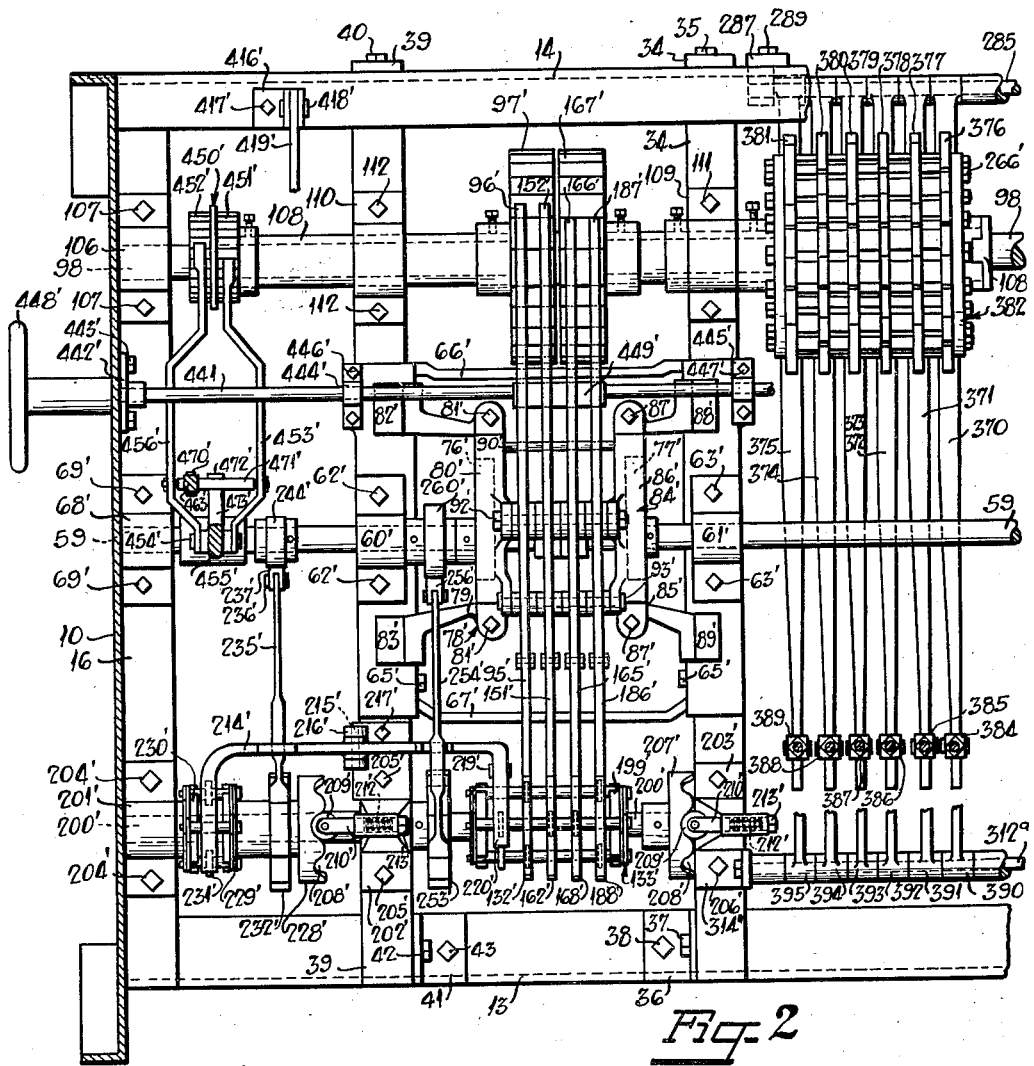
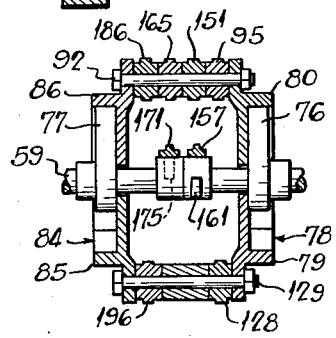

Nov. 23, 1937. E. P. FLOYD ET AL 2,099,729
PATTERN CONTROL AND SHEDDING MECHANISM FOR LOOMS
Filed Sept. 10, 1934 10 Sheets-Sheet 4

Eugene P. Floyd
and
Arthur G. Hackney
Inventors

By (signature)
Attorney

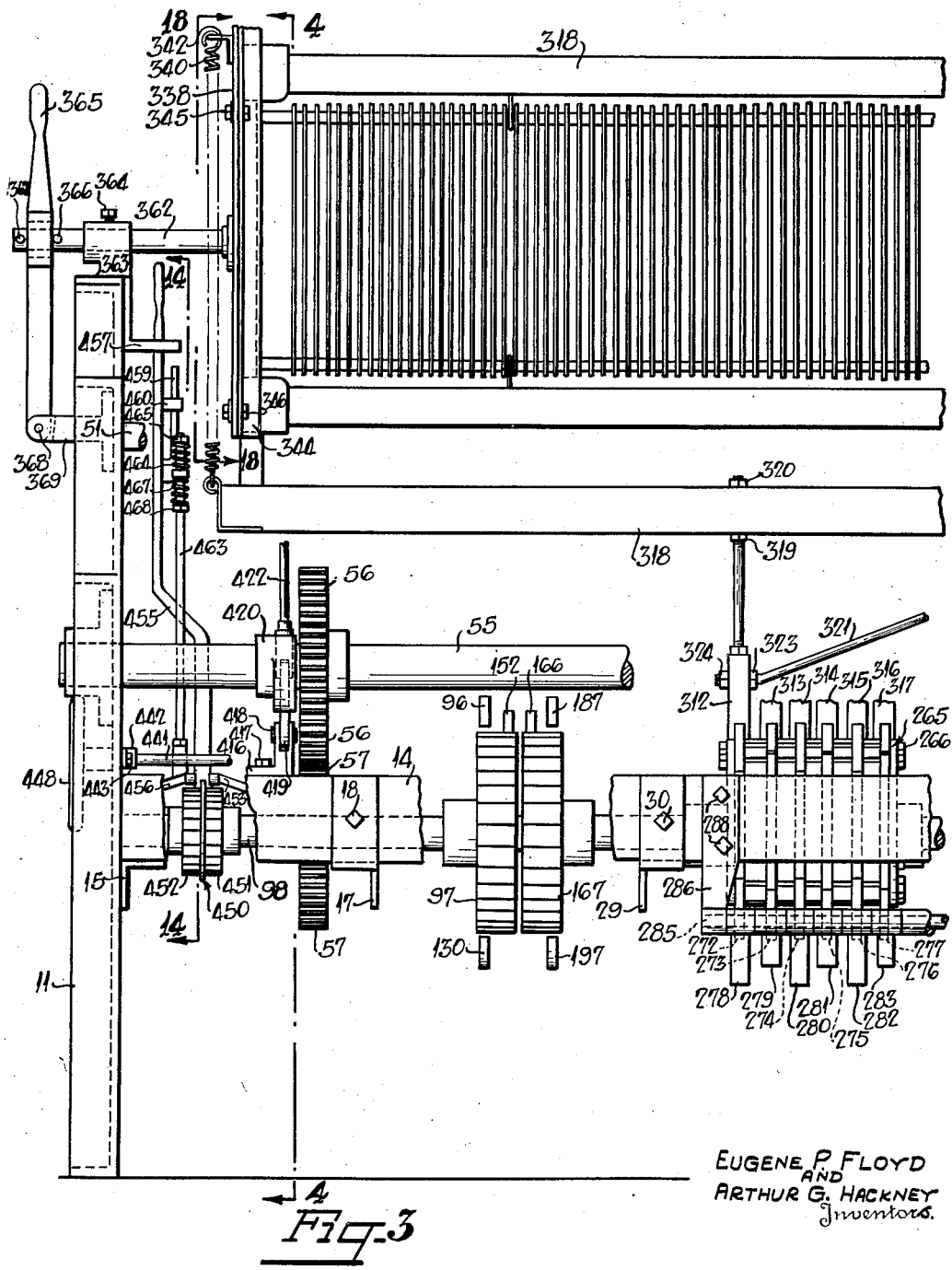

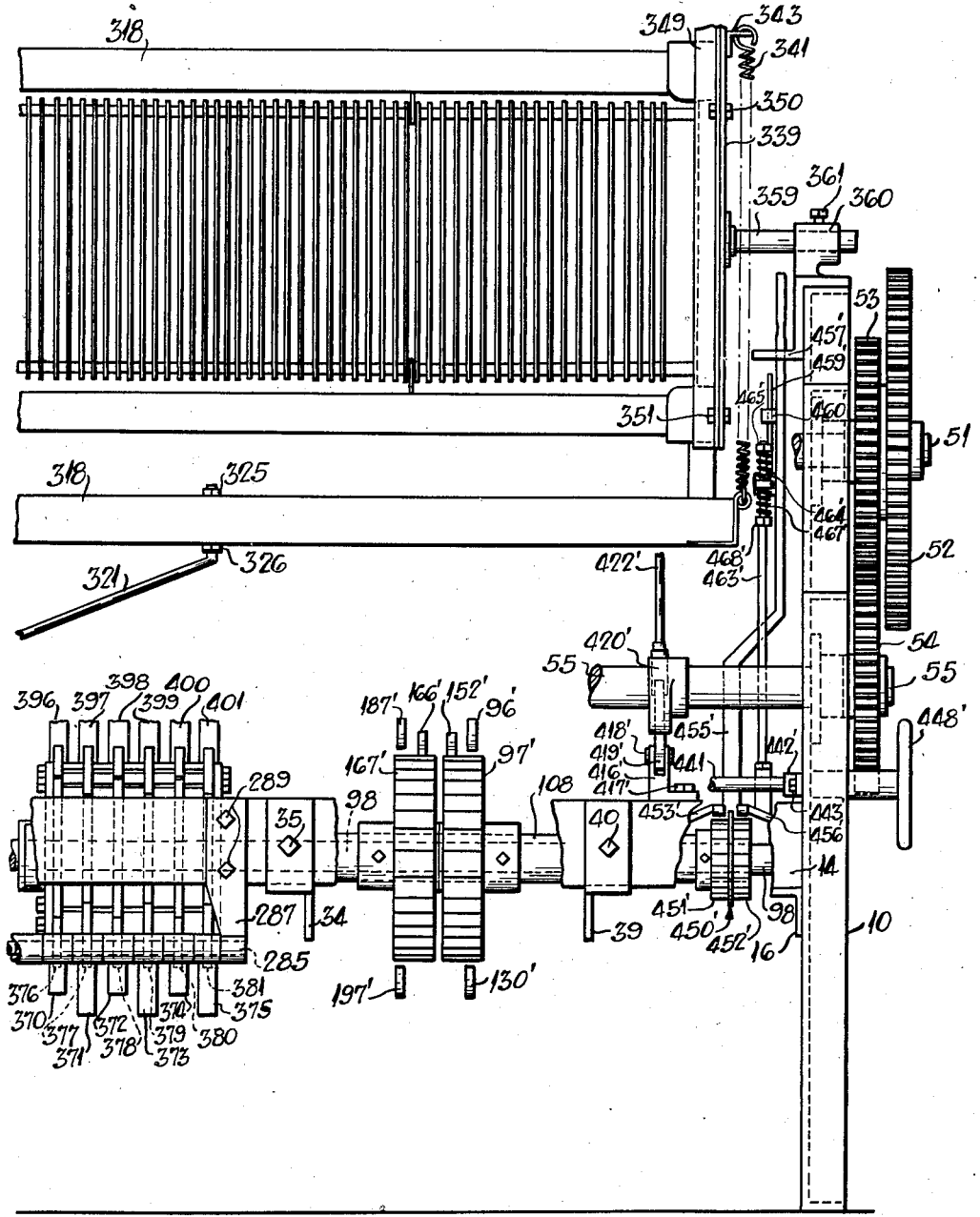

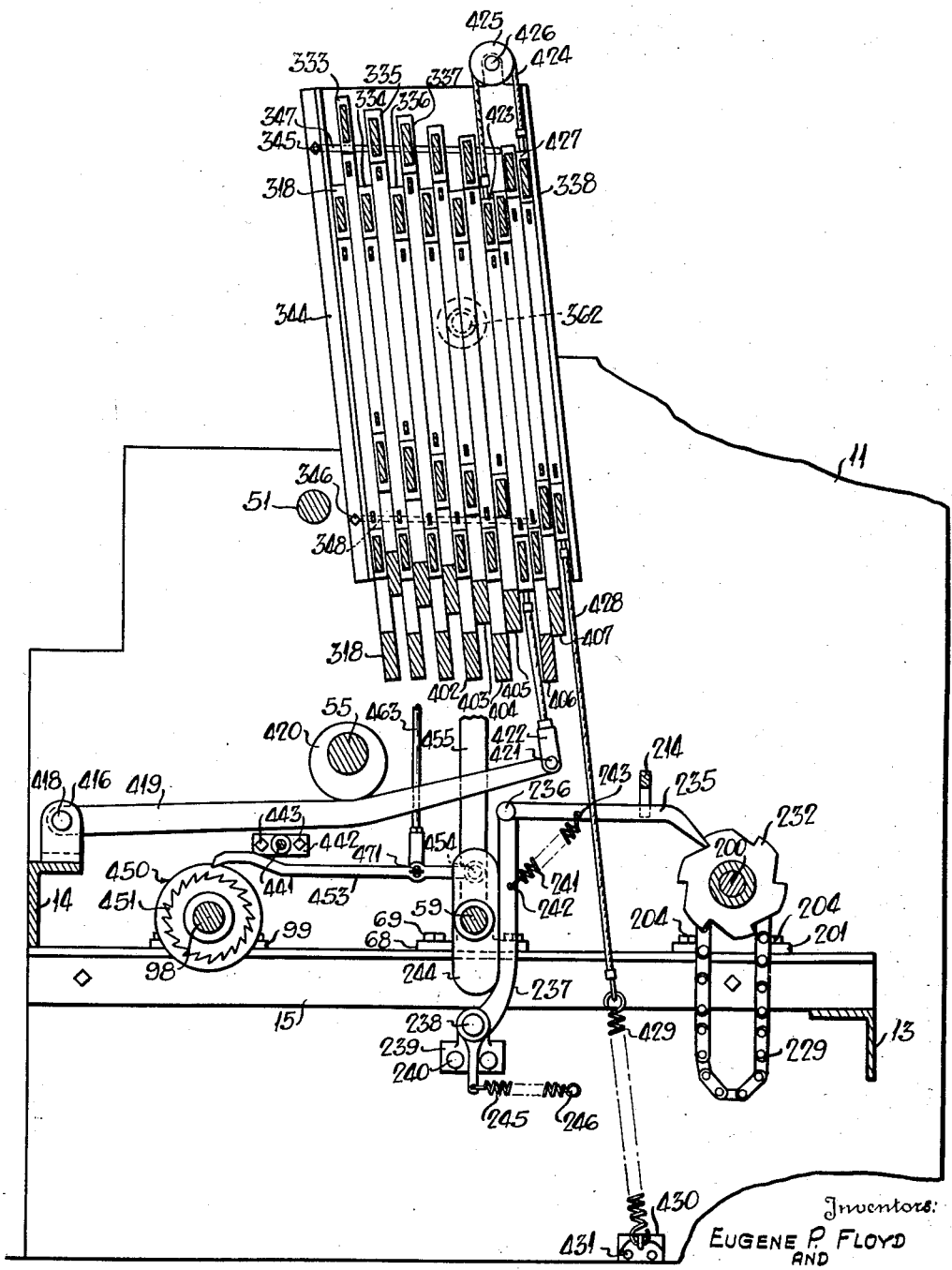

Nov. 23, 1937.　　　E. P. FLOYD ET AL　　　2,099,729
PATTERN CONTROL AND SHEDDING MECHANISM FOR LOOMS
Filed Sept. 10, 1934　　　10 Sheets-Sheet 8

Eugene P. Floyd
and
Arthur G. Hackney
Inventors

By　*Paul B Eaton*
Attorney

Nov. 23, 1937.  E. P. FLOYD ET AL  2,099,729
PATTERN CONTROL AND SHEDDING MECHANISM FOR LOOMS
Filed Sept. 10, 1934  10 Sheets-Sheet 9

EUGENE P. FLOYD
AND
ARTHUR G. HACKNEY
Inventors

By  *[signature]*
Attorney

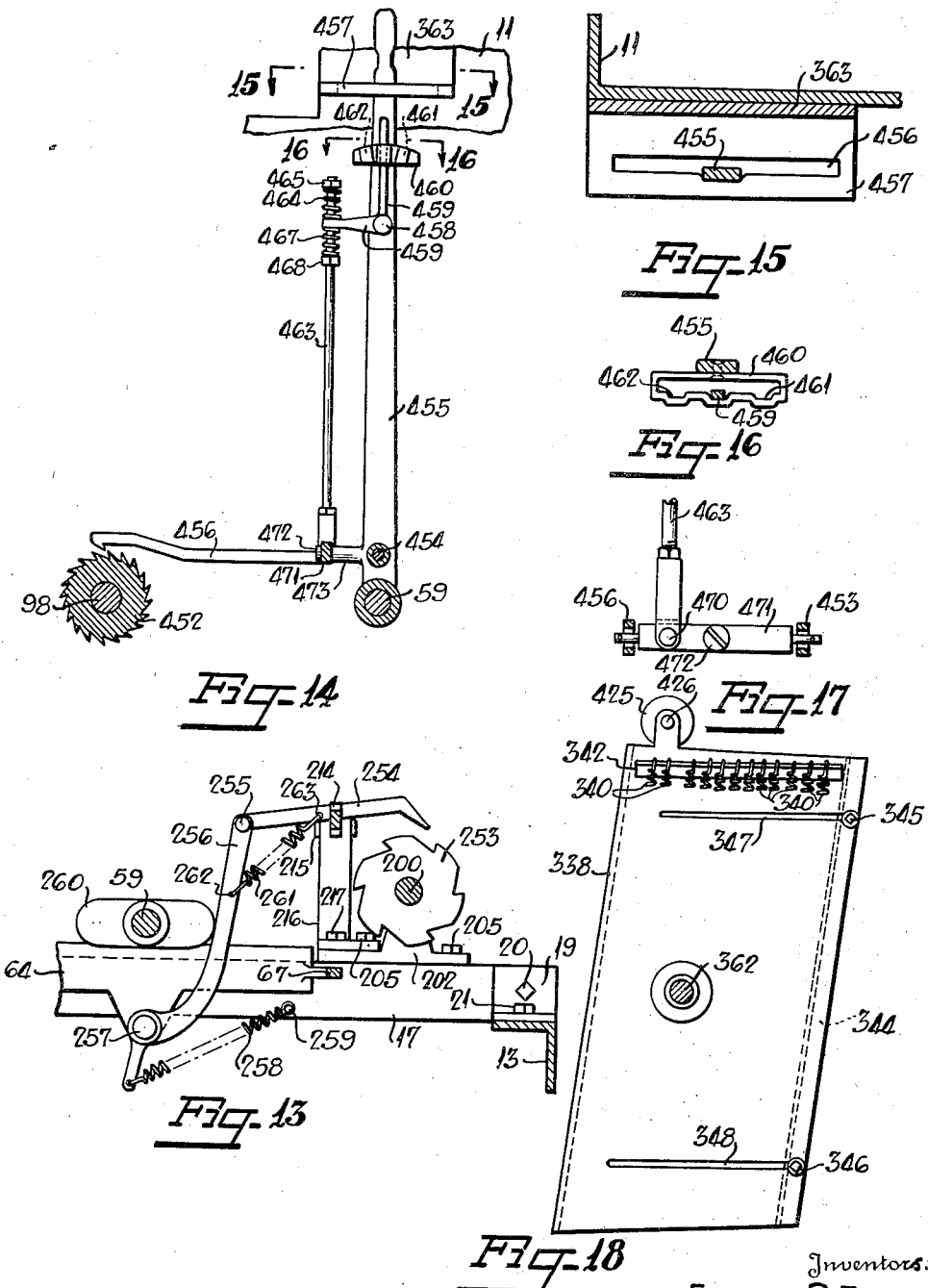

Patented Nov. 23, 1937

2,099,729

UNITED STATES PATENT OFFICE 2,099,729

PATTERN CONTROL AND SHEDDING MECHANISM FOR LOOMS

Eugene P. Floyd and Arthur G. Hackney, Tucapau, S. C., assignors of one-half to C. C. Wyche, Donald Russell, Sam J. Nichols, and Alfred Moore, all of Spartanburg, and George Hill, Wellford, S. C.

Application September 10, 1934, Serial No. 743,431

8 Claims. (Cl. 139—55)

This invention relates to a pattern control and shedding mechanism for looms and more especially to a pattern control mechanism comprising a pattern chain operating in conjunction with a pattern drum to operate the shedding mechanism. Heretofore, in dobby looms it has been found necessary in weaving complicated designs in a fabric, to make up a long chain to conform to the design being woven. This chain, very often, had to be several hundred links long to obtain the large number of combinations of positions of the harnesses for forming the design in the cloth, consequently, a large amount of space was required to accommodate the chain.

It is therefore an object of this invention to provide a pattern control mechanism which comprises a pattern drum, a short pattern chain for controlling the operation of said drum and a multiplying chain for controlling the pattern chain.

It is another object of this invention to provide a shedding mechanism normally held upwardly by resilient means and pulled downwardly by cams in the pattern drum at predetermined intervals. Since harnesses are pivotally connected by a rigid member and the treadles are normally contacting the cams on the pattern drums, there is no danger of shed changing due to the stretching of the connecting links, such as cords and the like, after it has once been formed.

It is a further object of this invention to provide a pattern drum with removable cams placed therein whereby the cams may be placed at desired intervals to form the pattern. It is evident that any combination of the cams may be used, that is, a one pick cam, two pick cam, three pick cam and so on, and placed at various positions which will form a different combination. A one pick cam will maintain the shed during one pick of the loom, a two pick cam for two picks of the loom, and so on.

It is still a further object of this invention to provide a pick finding arrangement whereby the pick may be found when an end breaks down in the filling. Means are provided for rendering the other parts of the apparatus inoperable while the pick finding arrangement operates the shaft upon which the pattern drums are mounted.

It is still another object of this invention to provide a loom having a plurality of harnesses disposed at an angle to the vertical, with means for lowering the harnesses, with a pattern drum for operating the raising and lowering means, with means for advancing the pattern drum, step by step, with a pattern chain for controlling the means for advancing the pattern drum, with a multiplier chain for controlling the movements of the pattern chain, together with means for controlling the direction of movement of the pattern drum.

Some of the objects of the invention having been stated, other objects will appear as the description proceeds when taken in connection with the accompanying drawings, in which:—

Figure 2 is a sectional plan view of the parts shown in Figure 1 and taken directly below the pick shaft in the loom;

Figure 3 is a rear elevation of the portion of the loom shown in Figure 1A and showing the harness mechanism;

Figure 3A is a rear elevation of portions of the loom shown in Figure 1 and also showing the harness in elevation and the driving means for the loom;

Figure 4 is a vertical sectional view taken along line 4—4 in Figure 3;

Figure 13 is a transverse sectional view taken along line 13—13 in Figure 2A;

Figure 14 is a vertical sectional view taken along line 14—14 in Figure 3 showing the pick-finding mechanism;

Figure 15 is a sectional plan view taken along line 15—15 in Figure 14;

Figure 16 is a sectional plan view taken along line 16—16 in Figure 14;

Figure 17 is a sectional view taken along line 17—17 in Figure 2A;

Figure 18 is a sectional view taken along line 18—18 in Figure 3 showing the harness magazine;

Figure 2A:
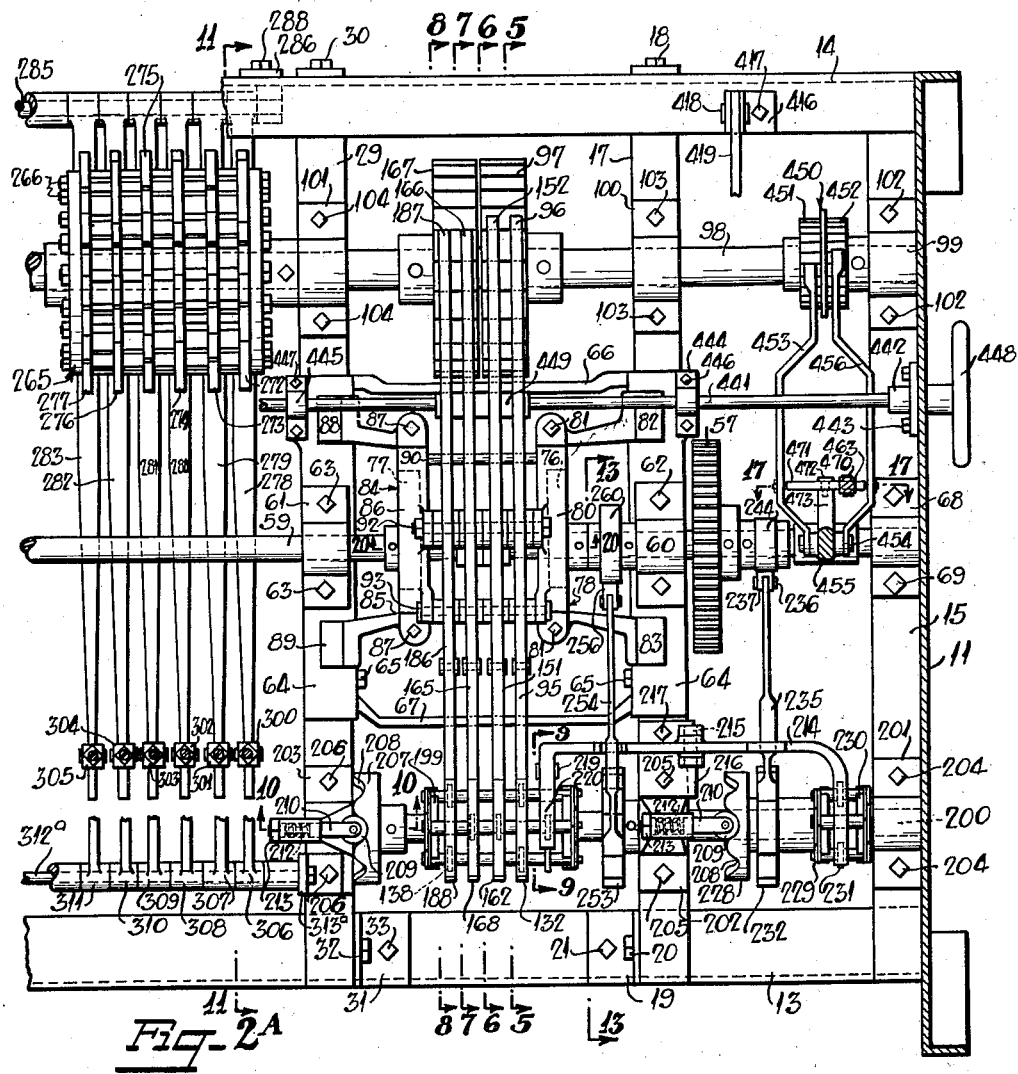
Figure 2A is a sectional plan view of the parts shown in Figure 1A and taken directly below the pick shaft in the loom.
Figure 5:
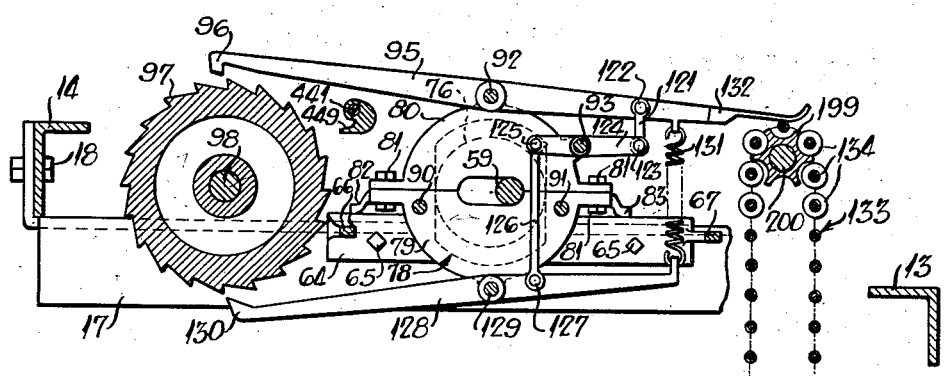
Figure 5 is a transverse sectional view taken along the line 5—5 in Figure 2A.

Figure 20 is a longitudinal sectional view taken along line 20—20 in Figure 2A but showing the eccentrics rotated 90 degrees from the position shown in Figures 2A and 5.

Referring more specifically to the drawings, the numerals 10 and 11 denote the end frames of a loom which are secured to each other at their lower ends by suitable struts 13 and 14. Other struts 15 and 16 are secured to side walls 11 and 10 respectively. One end of strut 17 is secured to strut 14 by any suitable means such as bolt 18, (see Fig. 2A) and the other end of strut 17 has a clip angle 19 secured to the end thereof by any suitable means such as bolt 20, said angle member 19 having its outstanding leg secured to strut 13 by any suitable means such as bolt 21. A similar strut 29 has its ends secured in a similar manner to strut 14 by any suitable means such as a bolt 30 and the other end of this member 29 has an angle member 31 secured thereto by any suitable means such as bolt 32, the outstanding leg of said angle member being secured to strut 13 by any suitable means such as bolt 33.

Strut 34 is secured at one end to strut 14 by any suitable means such as bolt 35, and the other end of this strut has an angle member 36 secured thereto by any suitable means such as bolt 37, said angle member 36 having its horizontal leg normally resting on top of strut 13 and being secured thereto by means of bolt 38. A similar member 39 has its end secured in a like manner to strut 14 by any suitable means such as stud bolt 40 and the other end of member 39 has an angle member 41 secured on the end thereof by any suitable means such as bolt 42.

The horizontal leg of angle member 41 normally rests on the top of strut 13 and is engaged thereto by any suitable means such as bolt 43. It should be noted that transverse struts 17, 29, 34 and 39 are similar and have their upper surfaces disposed at the same elevation. The structure described thus far comprises the framework upon which the invention is mounted and which will presently be described.

Rotatably mounted in end frames 10 and 11 is a conventional crank shaft 51 (see Figs. 3 and 3A) upon which is fixedly mounted on the end thereof a gear 52. Another gear 53 is also fixedly mounted on crank shaft 51 which meshes with gear 54 which is fixedly mounted on pick shaft 55, said shaft 55 being rotatably mounted in end frames 10 and 11.

Figure 1:
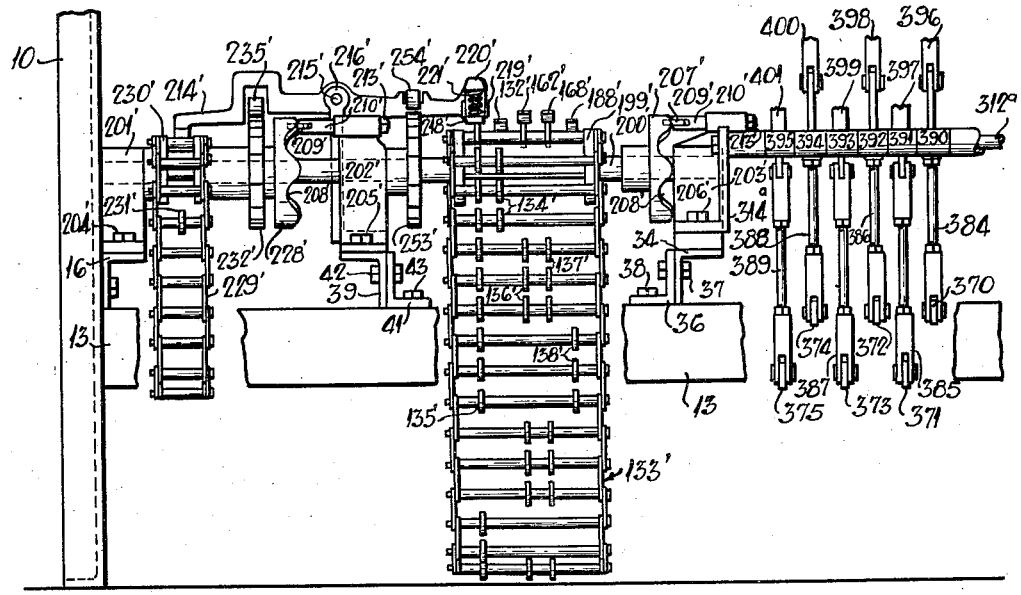
Figure 1 is a front elevation of the lower left-hand portion of a loom showing the invention applied thereto.

A suitable source of power, not shown, is adapted to drive gear 52 to cause the same to rotate and to operate the loom. Another pinion 56 is fixedly mounted on pick shaft 55 (Fig. 3) which meshes with pinion 57 fixedly secured on eccentric shaft 59. It should be noted that the apparatus is practically symmetrical about the center line with a few exceptions which will later be described, therefore, a description of the parts on one side of the loom will be made and similar parts located on the other side of the loom will be given a prime notation. The parts having a prime notation added thereto as shown in Figures 1 and 2, for example, will be of the same construction as the parts shown in Figures 1A and 2A which have no prime notations.

The central portion of eccentric shaft 59 is rotatably mounted in bearings 60, 61, 60', and 61', said bearings being secured to frames 64 and 64' by any suitable means such as bolts 62, 63, 62', and 63' respectively, and the shaft 59, at its ends, is rotatably mounted in bearings 68 and 68' which in turn are secured to the top of struts 15 and 16 by any suitable means such as bolts 69 and 69' respectively. Frame 64 rests on the top of struts 17 and 29 and is secured thereto by any suitable means such as bolt 65. The frame 64 has spacer members 66 and 67 which separate the portions resting upon transverse members 17 and 29, so that these portions may be parallel at all times.

Fixedly secured to shaft 59 are eccentrics 76 and 77. Eccentric 76 rotates in housing 78 (Figs. 2A and 5), which is comprised of a lower casing 79 and an upper casing 80 said casings being secured to each other by any suitable means such as bolt 81. The lower casing 79 has projections 82 and 83 extending therefrom which normally slide on top of frame 64. An identical eccentric 77 is mounted in a similar housing 84 which is comprised of a lower portion 85 and an upper portion 86 which portions are secured to each other by any suitable means such as bolts 87. The lower portion 85 likewise, has the extensions 88 and 89 integral therewith which slide on top of the frame 64. These extensions are similar to extensions 82 and 83 and act as supports for the eccentric housing 84. The eccentric housings 78 and 84 are tied to each other by any suitable means such as bolts 90, 91, 92, 93, and 129. It is seen that as shaft 59 rotates that the eccentrics 76 and 77 will oscillate the housings 78 and 84 back and forth in a horizontal manner and likewise oscillate the levers and parts attached thereto which will later be described.

A lever 95 is mounted for oscillation on bolt 92 (Figs. 2A and 5), and the left-hand end of this lever has a hook portion 96 which is adapted to engage at certain times the notches in ratchet wheel 97. Ratchet wheel 97 is fixedly secured on shaft 98 which has one end rotatably mounted in bearing 99, and an intermediate portion mounted in bearings 100 and 101 all of which are secured to struts 15, 17, and 29 by any suitable means such as bolts 102, 103 and 104 respectively.

The other end of shaft 98 (Fig. 2) is rotatably mounted in bearing 106 which is secured to transverse strut 16 by any suitable means such as bolts 107. The portion of shaft 98 intermediate the bearings 101 and 106 is rotatably mounted in a sleeve 108, said sleeve 108 being rotatably mounted in bearings 109 and 110. These bearings are secured to the top of members 34 and 39 by any suitable means such as bolts 111 and 112 respectively.

Referring again to Figure 5 it is seen that the right-hand end of lever 95 has pivotally secured thereto as at 122 a downwardly extending link 121, the lower end of said link being pivotally secured as at 123 to a horizontally disposed lever 124. Lever 124 is mounted for oscillation on bolt 93, the left-hand end of said lever 124 being pivotally secured as at 125 to another downwardly extending link 126. The lower end of link 126 is pivoted as at 127 to a lever 128 which, in turn, is mounted for oscillation on horizontally disposed bolt 129. The left-hand end of lever 128 has a pointed end 130 which is adapted to engage the teeth in ratchet wheel 97 at the same time the hooked portion 96 engages the top portion of the ratchet wheel.

The right-hand end of lever 128 has a tension spring 131 secured on the end thereof which extends upwardly and is connected to the lower side of the right-hand portion of lever 95. The spring 131 normally holds the levers 95 and 128 in the position shown in Figure 5 since members 121, 124 and 126 produce an equalizing effect and movement of one of the levers in one direction will cause the other lever to move the same amount in the opposite direction. It is further seen that the right-hand portion of lever 95 has a resilient member 132 secured on the end thereof which normally engages the pattern chain 133.

It will be noted that as pattern chain 133 revolves, that rollers 134 will move directly under the resilient member 132 and cause the hooked portion 96 of lever 95 and the pointed portion 130 of lever 128 to engage the ratchet wheel 97 and to advance the ratchet wheel a predetermined amount. In other words, upon movement to the left of eccentric housings 78 and 84, due to the rotation of eccentrics 76 and 77 on shaft 59, (Figs. 5 and 2A), the point 130 will engage a tooth in the lower side of wheel 97 and advance the ratchet wheel 97 one tooth in a clockwise manner, whereas, as the eccentric boxes 78 and 84 are moved to the right in Figure 5, upon further rotation of eccentric shaft 59, the hooked portion 96 will engage a tooth in the upper side of ratchet wheel 97 and advance ratchet wheel 97 another tooth in a clockwise manner.

It is thus seen that a roller 134 is disposed beneath the resilient member 132 that each time the eccentric shaft 59 makes a revolution that the ratchet wheel 97 will be rotated in a clockwise manner in Figure 5 to the extent of two teeth in the ratchet wheel.

The resilient member 132, in the present instance, is shown disposed upon a bar in the pattern chain and is not elevated enough or a sufficient amount to cause the points 96 and 130 to engage the ratchet wheel 97. By referring to Figure 19, the construction of chain 133 is more clearly shown.

Figure 1A:
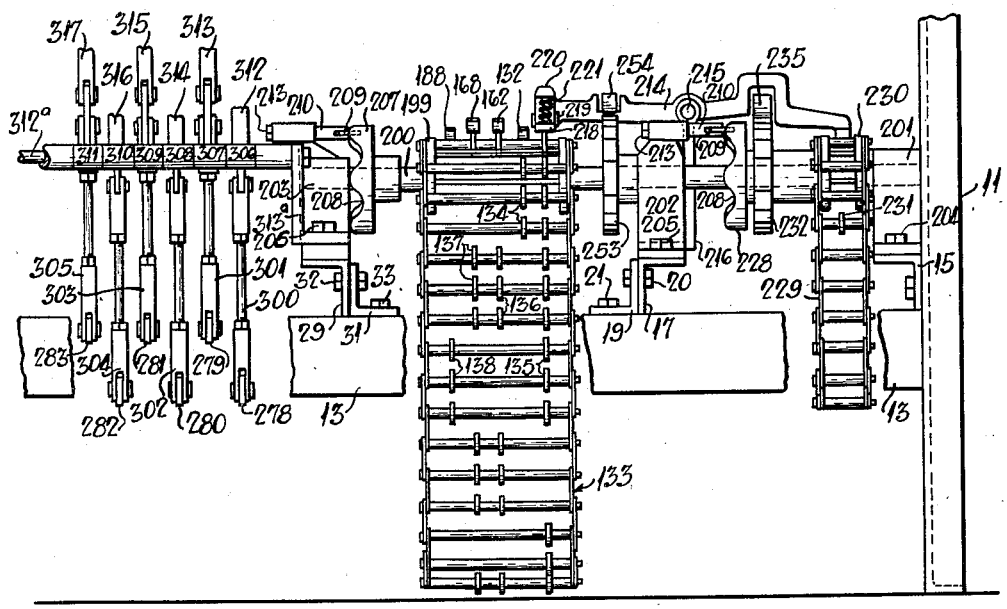
Figure 1A is a front elevation of the lower right-hand portion of the loom showing the invention applied thereto.
Figure 19:
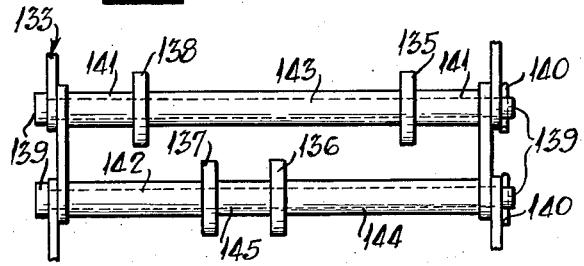
Figure 19 is an enlarged detail view of an enlarged portion of the pattern chain showing means for constructing the same in a desired manner.

It will be noted by referring to Figure 1A, that pattern chain 133 has five vertical rows of rollers, namely, 134, 135, 136, 137 and 138, each row of rollers being adapted to contact the end of a lever arm. In Figure 19, the detail of the chain only shows rollers 135, 136, 137, and 138, the rollers 134 being omitted at the point where this particular detail is taken. These rollers are mounted on bolts 139 which connect the two side portions of the chain together, a suitable cotter key 140 holds the bolts in place. Spacer tubes or washers 141, 142, 143, 144, and 145 are provided to space the rollers at the desired point. It is evident that when the cotter pins 140 are removed that the bolt 139 can also be moved from the chain and spacer tubes of different lengths placed therein to place the rollers at different positions. Of course the spacing of the rollers is determined by the pattern which is being woven upon the loom.

Figure 6:
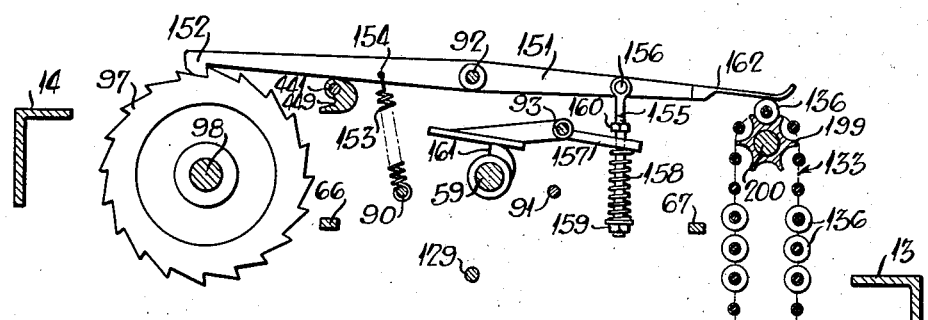
Figure 6 is a transverse sectional view taken along line 6—6 in Figure 2A.

In Figure 6 another lever 151 is shown mounted for oscillation upon bolt 92, the left-hand end of said lever having a hooked portion 152 which is adapted to engage at certain times the teeth in the ratchet wheel 97. The left-hand portion of this lever has a tension spring 153 secured thereto as at 154 and this spring extends downwardly and has its lower end secured to bolt 90.

The right-hand end of lever 151 has a bolt 155 pivotally secured thereto as at 156 and this bolt extends downwardly, penetrating the right-hand end of lever 157. A compression spring 158 is confined on the lower end of bolt 155 by any suitable means such as nut 159. This spring normally pushes the right-hand end of lever 157 upwardly against nut 160. Lever 157 is mounted for oscillation on bolt 93 and has its left-hand end engaging a cam 161 which is fixedly secured on eccentric shaft 59. The right-hand end of lever 151 likewise has a resilient member 162 which contacts the line of rollers 136 on pattern chain 133.

In the position shown in Figure 6, the resilient member 162 is shown contacting a roller 136 and the hooked portion 152 is shown engaged in the ratchet wheel 97. The mechanism shown in Figure 6 is adapted to cooperate with the mechanism shown in Figure 7, to hold their respective ratchet wheels in a fixed position while the rocker motion of the pattern drum takes place; however, it might be stated here, that the spring 153 is weaker than the spring 158 so that the right-hand end of lever 151 will move downwardly when a roller 136 is not disposed beneath the resilient member 162. The spring 153 only assists the resilient member 162 in holding the hooked portion 152 downwardly in engagement with the ratchet wheel 97 when a roller is disposed beneath the resilient member 162. The cam 161 does not move the lever 151 in any manner when a roller is present beneath the resilient member 162, since the right-hand end of lever 157 is resiliently held upwardly by means of compression spring 158. It is only when a roller is not present beneath the resilient member 162, that the cam 161 causes the right-hand portion of lever 151 to move downwardly thereby causing the hooked portion 152 on the left-hand end to be disengaged from the ratchet wheel 97 each time the eccentric shaft 59 makes a complete revolution.

When a roller 136 is not under the right-hand end of lever 151, the cam 161 will operate the levers 157 and 151 when the parts are at their extreme left-hand position as shown in Figure 6, to cause hooked portion 152 to be disengaged from the ratchet wheel when the travel to the right begins.

Figure 7:
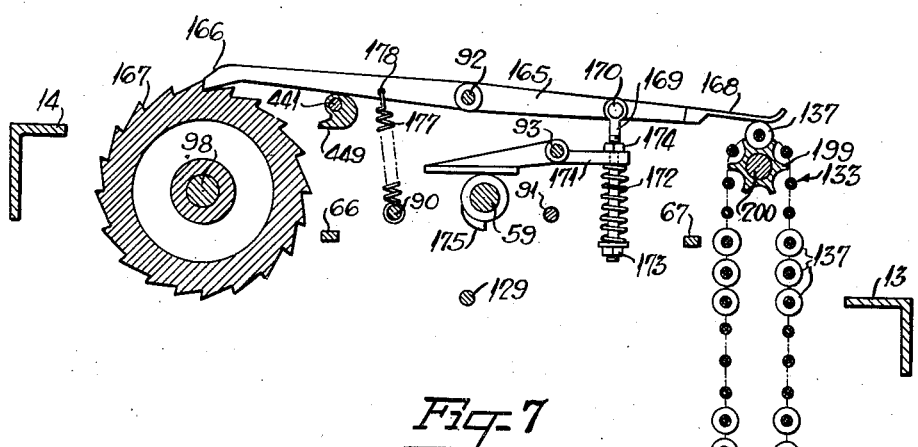
Figure 7 is a transverse sectional view taken along line 6—6 in Figure 2A.

Figure 7 shows a structure very similar to that shown in Figure 6 and is adapted to be operated in the same manner and at the same time. A lever 165 is mounted for oscillation on bolt 92 and this lever has a pointed end 166 which is adapted to engage, at certain times, the ratchet wheel 167 which is fixedly mounted on shaft 98. It should be noted that ratchet wheel 167 has its teeth disposed in the opposite direction from the teeth in ratchet wheel 97, so that when the hooked portion 152 engages the teeth in ratchet wheel 97 and the pointed portion 166 engages the teeth in ratchet wheel 167, the shaft 98 will be oscillated. In other words, the hooked portion 152 will secure the shaft 98 from rotation in one direction and the pointed portion 166 secures the shaft 98 from rotating in the other direction and therefore, the shaft 98 will only oscillate the amount that the eccentric housings 78 and 84 move. This will produce a rocker motion which is effected only when a roller is disposed beneath the right-hand end of levers 151 and 165.

The right-hand end of lever 165 of Figure 7 has a resilient member 168 secured thereto which is adapted to contact the line of rollers 137 on pattern chain 133. It should be noted that the rollers 137 and 136 are disposed in pairs and there is a roller disposed beneath the resilient member 162 and also there is a roller disposed beneath the resilient member 168, thereby causing the levers 151 and 165 to operate simultaneously.

A downwardly projecting bolt 169 is pivotally secured to the right-hand portion of lever 165 as at 170 and this bolt penetrates the right-hand end of another lever 171 which is similar in all respects to lever 157 previously described. A compression spring 172 is disposed beneath lever 171 and around the bolt 169. This compression spring is confined on the bolt 169 by any suitable means such as nut 173. It is seen that the spring 172 normally forces the right-hand end of lever 171 up against nut 174 which nut is also secured on bolt 169 directly above the right-hand portion of lever 171. The left-hand end of lever 171 contacts a cam 175 which is fixedly secured on eccentric shaft 59. Tension spring 177 is secured as at 178 to the left-hand portion of lever 165 and the lower end of tension spring 177 is secured to pin 90 and is similar in all respects to spring 153 just described and serves the same purpose, that is, to assist the resilient member 168 in causing the pointed end 166 to engage the ratchet wheel 167 when a roller is disposed beneath the resilient member 168.

With a roller 137 disposed beneath the right-hand end of lever 165 as shown in Figure 7, the rotation of cam 175 will not affect the lever 165 in any manner for when the high side of cam 175 is disposed beneath the lever 171, the spring 172 will be compressed and thereby not affect the lever 165. When a roller is not present beneath the right-hand end of lever 165, the cam 175 will cause the right-hand end of lever 165 to move downwardly each revolution of eccentric shaft 59 since the tension spring 177 is weaker than the compression spring 172. The lever 165 is shown at the extreme left-hand position in Figure 7, therefore when there is no roller beneath the end of this lever, the end 166 will be in engagement with ratchet wheel 167, but since the lever 165 is traveling to the right the wheel 167 will not be affected.

When the shaft 59 rotates 180 degrees from the position shown in Figure 7 and there is still no roller beneath the right-hand end of lever 165 the high side of cam 175 will operate lever 171 and cause the left-hand end of lever 165 to be in raised position as the eccentric boxes which carry the lever 165, move again to the left in Figures 6 and 7, therefore the ratchet wheel 167 will not be operated by lever 165 when there is no roller present beneath the right-hand end of these levers. In other words, when there is no roller present beneath the resilient member 162 the high side of cam 161 will be disposed beneath the left-hand end of lever 157 as the lever 151 moves to the right in Figure 6, but when a roller is present beneath the resilient member, the action of cam 161 will not affect the lever 151, and the hooked end 152 will engage ratchet wheel 97 upon movement of the same to the right.

Likewise, when there is no roller beneath the resilient member 168, the high side of cam 175 will be disposed beneath the left-hand end of lever 171 as the lever 165 moves to the right in Figure 7, but when the roller is beneath the resilient member the action of cam 175 will not affect the lever 165 and the pointed end 166 will engage ratchet wheel 167 upon movement to the left.

Figure 8:
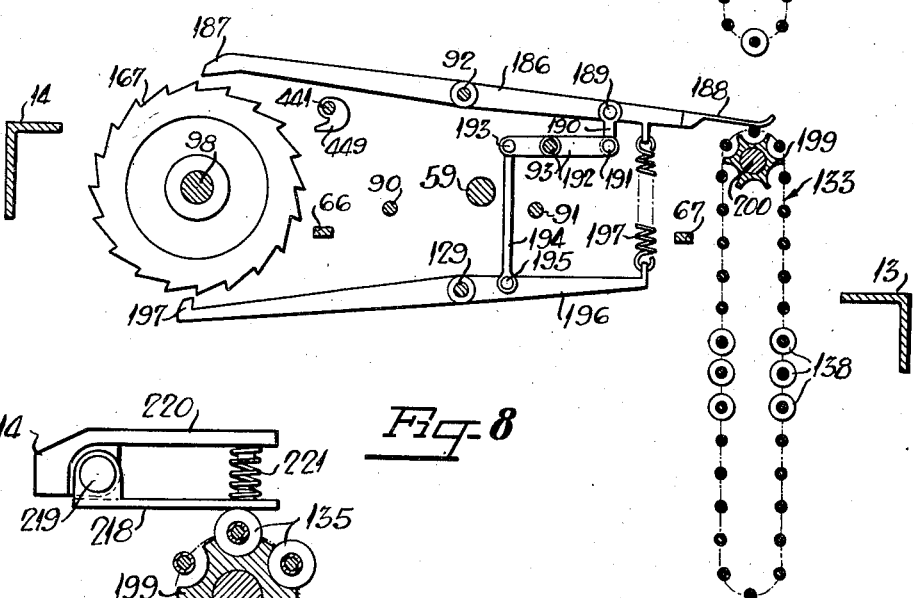
Figure 8 is a transverse sectional view taken along line 8—8 in Figure 2A.

Figure 8 shows a structure very similar to that shown in Figure 5, but shows means for rotating the shaft 98 in a counterclockwise direction. A lever 186 is mounted for oscillation on bolt 92, and this lever has a pointed end 187 which is adapted to engage the ratchet wheel 167 at certain times. Lever 186 has a resilient member 188 on the right-hand end thereof which contacts a line of rollers 138 on pattern chain 133. Pivotally secured as at 189 is a downwardly extending link 190 which in turn, is secured as at 191 to horizontally disposed lever 192. Lever 192 is mounted for oscillation upon a bolt 93 and the left-hand end of this lever has secured thereto as at 193 another downwardly extending link 194. The lower end of link 194 is pivotally secured as at 195 to the right-hand portion of lever 196, mounted for oscillation on bolt 129. Secured to the right-hand end of lever 196 is a tension spring 197 which projects upwardly and has its upper end secured to the right-hand end of lever 186. This spring causes the levers 186 and 196 to move simultaneously, that is, when the left-hand portion of one lever is out of engagement with the ratchet wheel, the corresponding portion of the other lever is also out of engagement. This is made effective by the means of links 190, 192, and 194 which act as equalizers for the two levers. The lever 196 has a hooked portion 197 on the left-hand end thereof which is adapted to engage the lower side of ratchet wheel 167 at certain times. Levers 186 and 196 are disposed at the extreme left-hand position in Figure 8. When a roller 138 moves beneath the right-hand end of lever 186, the portions 187 and 197 will engage the ratchet wheel 167. As these levers move to the right from the position shown in Figure 8, the portion 197 will engage a ratchet tooth and rotate the ratchet wheel 167 one notch in a counter clockwise manner and as the levers 186 and 196 are moved again to the right on the completion of a revolution of eccentric shaft 59, the portion 187 will engage the ratchet tooth in the upper side of ratchet wheel 167 and rotate this wheel another notch in a counterclockwise manner. This action is exactly the reverse of the action which takes place in the mechanism shown in Figure 5 since the teeth in the ratchet wheels 167 and 97 are pitched in opposite directions. In other words, the mechanism shown in Figure 5 is constructed to cause a clockwise rotation of the shaft 98 whereas, the mechanism shown in Figure 8 is constructed to cause a counterclockwise rotation. When the parts shown in Figures 6 and 7 are in an operative position, there are rollers beneath the right-hand end of levers 151 and 165. This, as has been previously stated, produces a rocker motion and when this is taking place there will be no rollers disposed beneath the right-hand end of levers 95 and 186. The pattern chain is made in this manner in order to prevent engagement of the left-hand portion of the levers 95, 128, 186, and 196, while the rocker motion is taking place.

When the parts as shown in Figure 5, are in operation, due to the roller being disposed beneath the right-hand end of lever 95 the parts shown in Figures 6, 7, and 8 are in inoperative position and there are no rollers disposed beneath the right-hand end of these levers. Likewise, when the parts shown in Figure 8 are in an operative position, and a roller is disposed beneath the right-hand end of lever 186 the parts shown in Figures 5, 6 and 7 are in inoperative position and there are no rollers beneath the right-hand end of the levers 95, 151, and 165.

Figure 10:
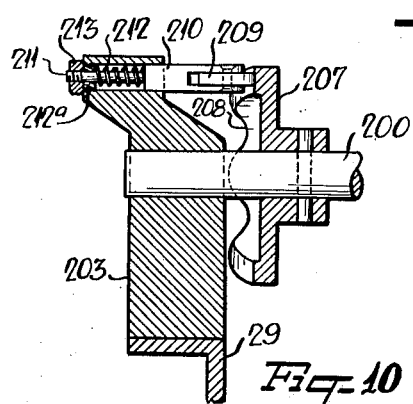
Figure 10 is a sectional view taken along line 10—10 in Figure 2A showing the means for resiliently holding the pattern chain in position.

The pattern chain 133 is mounted for rotation on a suitable sprocket 199 which is fixedly secured to shaft 200. Shaft 200 is rotatably mounted in bearings 201, 202, and 203 which are, in turn, secured to struts 15, 17 and 29 by any suitable means such as bolts 204, 205 and 206 respectively. Fixedly secured on the left-hand end of shaft 200 is a wheel 207 (Figs. 1A, 2A, and 10), which has cavities 208 in the left-hand face thereof. A roller 209 normally engages one of these cavities 208 and this roller is rotatably mounted in the right-hand end of a suitable plunger 210, said plunger 210 having a restricted portion 211 which is slidably mounted in the upper portion of bearing 203. The right-hand end of compression spring 212 normally abuts the enlarged portion of plunger 210 and the left-hand end of the spring abuts a suitable plug 212a which is secured in the end of the bore in which the plunger 210 is mounted. Nut 213 is threadably secured on the end of restricted portion 211 which limits the movements to the right of the plunger 210 under the force of the spring 212. It is seen that the roller 209 which occupies one of the cavities 208, will resiliently hold the shaft 200 and the sprocket 199 which is fixedly secured thereon, in position. Since there is a cavity 208 in the face of the wheel 207 to correspond to every corrugation in the sprocket wheel 199, each time the sprocket wheel 199 is advanced to cause another roller or transverse rod in the chain 133 to be disposed beneath one of the resilient members, the roller 209 will hold the sprocket in a fixed position until it is advanced another notch. At the time of the advancement of the sprocket 199, the roller 209 will move to the next cavity 208 and the spring 212 will be compressed to allow the plunger to be moved to the left. It is therefore seen that means have been provided for resiliently holding the sprocket 199 in position, after the sprocket 199 has been advanced a predetermined amount.

Figure 9:
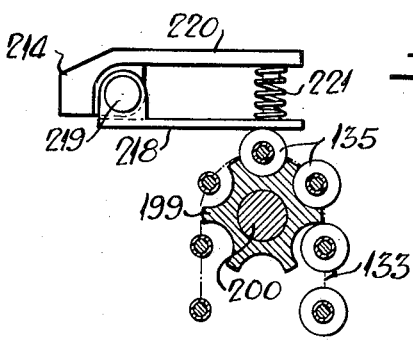
Figure 9 is a sectional view taken along line 9—9 in Figure 2A.

A lever 214 is pivotally mounted as at 215 in bearing 202 and the member 17 by any suitable means such as bolts 205 and 217. The left-hand end of lever 214 as viewed in Figures 1A and 2A and 9, has a member 218 pivoted on the end thereof as at 219. Disposed directly above member 218 is a portion 220 which is integral with lever 214 and a compression spring 221 normally abuts the lower side of this portion and the upper side of member 218. By having the member 218 mounted on the end of lever 214 in this manner, the lever is caused to resiliently engage the rollers 135 or the transverse sleeves on the pattern chain 133 at all times. The right-hand end of lever 214 contacts the multiplier chain 229 which is mounted on sprocket 230. The pattern chain 229 is similar in construction to pattern chain 133 which is shown in detail in Figure 19 and a detailed description is not deemed necessary, however, it might be stated that the chain may be dismantled and rollers spaced at desired intervals to conform to the pattern which is being woven upon the loom.

The multiplier chain 229 is adapted to have rollers 231 spaced at desired intervals to operate the lever 214. The sprocket 230 is rotatably mounted upon shaft 200 and has integral therewith a ratchet wheel 232 (see Fig. 4). Sprocket wheel 230 and a ratchet wheel 232 have integral therewith another wheel 228 which has corrugations 208 in the face thereof and which are adapted to be engaged by a roller 209 mounted on plunger 210. This structure is identical to the structure just described and shown in Figure 10 and serves to resiliently hold the ratchet wheel 232 and sprocket 230 in a fixed position when the ratchet wheel 232 is not being operated by the parts which will presently be described.

A lever 235 has its right-hand end (see Fig. 4), resting upon the ratchet 232 at all times and the left-hand end of lever 235 is pivotally secured as at 236 to the upper end of lever 237 which extends downwardly and is pivoted as at 238 to a bracket 239, said bracket being secured to the side frame 11 by any suitable means such as rivets 240. A tension spring 241 has one end thereof secured to the lever 237 as at 242 and its other end secured to lever 235 as at 243. This causes the right-hand end of lever 235 to resiliently rest against the ratchet wheel 232 at all times.

An elongated cam 244 is fixedly secured on eccentric shaft 59 and is held in contact with the arm 237 since the lower end of lever 237 has an extension to which is secured one end of tension spring 245. The other end of spring 245 is secured to a pin 246, which, in turn, is secured to the sidewall 11.

It is evident that when cam 244 makes a complete revolution that lever 235 will be moved to the right two times. This causes the ratchet wheel 232 to be advanced two notches which in turn causes two pins in multiplying chain 229, to pass beneath the right-hand end of lever 214.

By referring to Figures 1A, 2A, and 13 it will be seen that another ratchet wheel 253 is provided which is fixedly mounted on shaft 200. This ratchet wheel is very similar to ratchet wheel 232 which has just been described, and when this ratchet wheel is operated, it advances the pattern chain 133 and the shaft 200 a predetermined amount. The right-hand end of a lever 254 (see Fig. 13), is adapted to engage the notches in ratchet wheel 253 when the left-hand portion of lever 214 as viewed in Figure 1A, is in lowered position. Of course in order for the left-hand portion of lever 214 to be in a lowered position it will be necessary for a roller 231 on multiplier chain 229 to be disposed beneath the right-hand end of lever 214. Lever 254 is pivotally secured as at 255 to the upper portion of lever 256, which extends downwardly and is pivoted as at 257 to frame 64. Lever 256 has a projection on the lower end thereof to which one end of a tension spring 258 is secured and the other end of said spring is secured as at 259 to strut 17. This spring 258 normally holds the upper end of lever 256 in contact with a cam 260 which is similar in all respects to cam 244 which has been previously described, but it will be noted that it is disposed at 90 degrees on shaft 59 from the position of cam 244.

Tension spring 261 has one end thereof secured to lever 256 as at 262 and its other end secured to lever 254 as at 263. This causes lever 254 to normally rest against the top of lever 214 at all times when the left-hand portion of this lever as viewed in Figure 1A, is in raised position. It is thus seen that the multiplying chain 229 operates the pattern chain 133 through the lever 214.

The position of lever 214 determines whether or not the lever 254 is engaging ratchet 253.

When a roller 231 is moved beneath the right-hand end of lever 214 (Fig. 1A), the left-hand end moves downwardly and allows lever 254 to engage ratchet wheel 253 one notch. Since the cams 244 and 260 (see Figs. 4 and 13), are disposed at right angles to each other, it is seen that rollers 231 will be moved beneath the end of lever 214 when the high side of cam 244 engages lever 237. Then the high side of cam 260 engages lever 256 and causes the ratchet wheel 253 and chain 133 to be advanced one notch. While the ratchet wheel 253 is being advanced the lever 235 is returning to the position shown in Figure 4, and upon further rotation of shaft 59, the other high side of cam 244 will engage lever 237 to cause the ratchet wheel 232 and the multiplier chain 229 to be advanced another notch which will move the roller 231 from beneath the end of lever 214, thereby disengaging the lever 254 from engagement with ratchet wheel 253. When a roller 135 is not disposed beneath the left-hand end of lever 214 (Fig. 1A), this end of the lever will move downwardly, due to the downward force exerted on the lever by means of lever 254 and spring 261. The lever 254 will then engage ratchet wheel 253 and rotate the chain 133 until a roller again moves beneath the left-hand end of lever 214.

Figure 11:
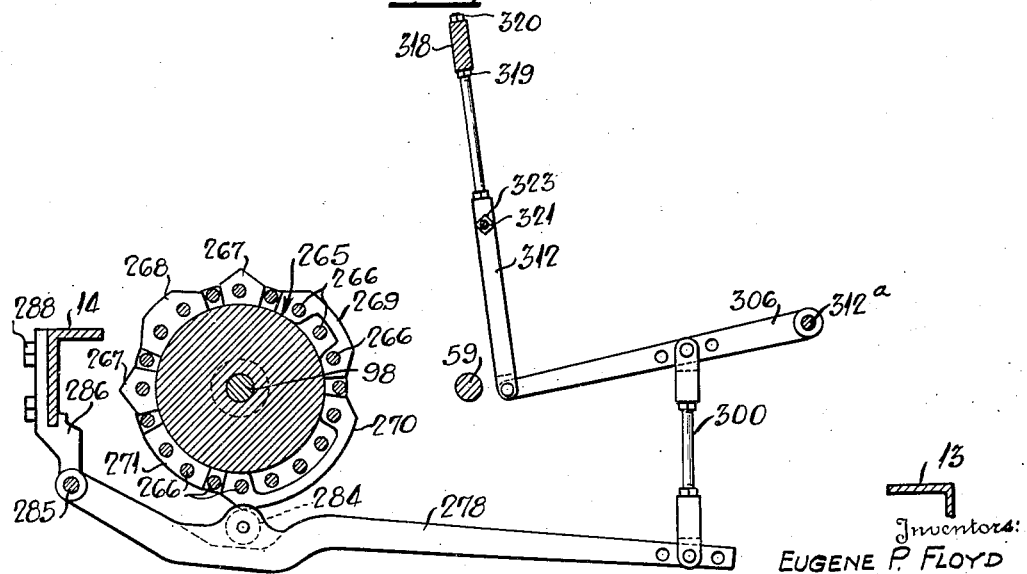
Figure 11 is a transverse sectional view taken along line 11—11 in Figure 2A and showing the details of the pattern drum.

Fixedly secured on shaft 98 is a pattern drum 265 which has suitable grooves in the periphery thereof in which suitable cams are removably mounted by means of bolts 266. It is seen that there are five peripheral grooves in the pattern drum 265 and that in each groove a plurality of cams are mounted such as 267, 268, 269, 270, and 271, (Fig. 11). It is evident that these cams may vary in their positions, shape and length to conform to the pattern to be woven upon the loom. The cam 267 will hold a treadle and harness down during one pick of the loom, cam 268 for two picks, cam 269 for three picks and cam 270 for four picks. Cam 271 is provided to allow a treadle and harness to remain in an elevated position and these cams may be disposed at desired points and made of variable lengths to conform to the pattern being woven. The rows of cams disposed in the pattern drums 265 will be noted by the reference characters 272, 273, 274, 275, 276, and 277. These cams are adapted to operate treadles 278, 279, 280, 281, 282, and 283 respectively. Each of the treadles has a roller 284 mounted in the upper side thereof (Fig. 11) which contacts the rows of cams 272 to 277 inclusive. One end of the treadles 278 to 283 inclusive is pivotally mounted on a bolt 285, said bolt 285 having its ends mounted in suitable bearings 286 and 287 which in turn are secured to longitudinal struts 14 by any suitable means such as bolts 288 and 289 respectively. The ends of the treadles 278 to 283 inclusive, nearest the observer in Figure 2A, are pivoted to the lower ends of vertically disposed links 300, 301, 302, 303, 304, and 305 respectively.

Figure 12:
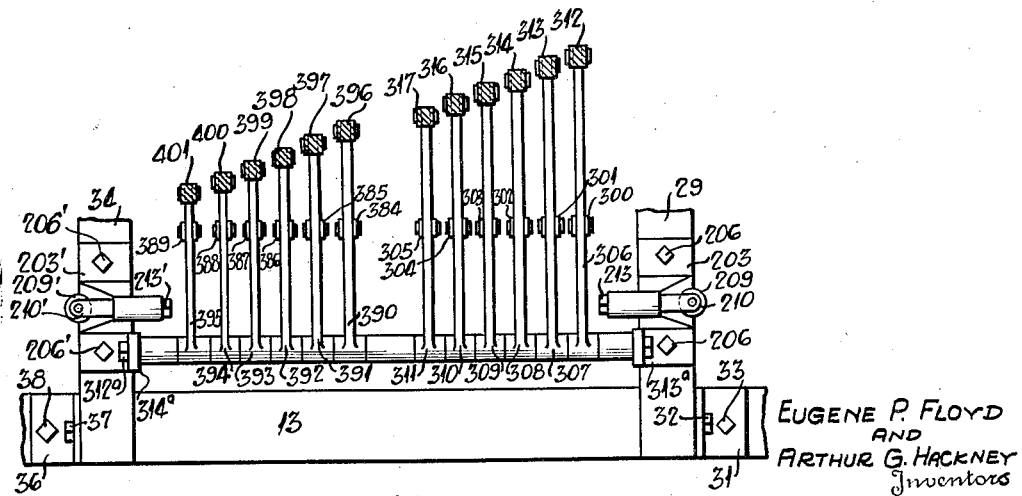
Figure 12 is a sectional plan view of the levers which operate the harness and looking down upon the right-hand portion of Figure 1 and the upper left-hand portion of Figure 1A.

All of these links are identical to link 300 shown in Figure 11, and are connected up in the same manner. Links 300 to 305, inclusive, extend upwardly and have their upper ends secured to the central portion of lever arms 306, 307, 308, 309, 310, and 311, Figure 12, said arms being pivotally secured on bolt 312a which is mounted in bearings 313 and 314, said bearings 313 and 314 being secured to bearings 203 and 203' by any suitable means such as bolts 205 and 205'. Levers 306 to 311 inclusive have pivotally secured on the ends thereof vertically disposed links 312, 313, 314, 315, 316, and 317 respectively, said links being similar in construction. One of the links is shown in detail in Figures 3, 3A, and 11, and it is not deemed necessary that the remaining links be shown in detail. Link 312 has its upper end secured in the jack stick of harness 318 by any suitable means such as having a nut 319 mounted on the upper end of link 312 and engaging the lower side of the jack stick and another nut 320 engaging the upper side of the jack stick thereby causing the jack stick to be fixed to the link. A brace 321 has one end penetrating the link 312 and is secured thereto by any suitable means such as nuts 323 and 324, which are disposed on opposite sides of member 312. The other end of brace 321 is secured to the jack stick of harness 318 by any suitable means such as nuts 325 and 326 which are disposed on opposite sides of the jack stick. Each of the connections, from the arms 306 to 311 inclusive to the harness frames, are similar to the connections 312 and its associated parts which have just been described.

The links 312 to 317 inclusive are connected to the jack sticks of harness 318, 333, and 337 inclusive, respectively, in a similar manner to that shown in Figures 3 and 3A. These harnesses are mounted for vertical movement in magazines 338 and 339 and are normally pulled upwardly by means of springs 340 and 341, said springs 340 and 341 having their lower ends connected to the jack stick of each of the harnesses and their upper ends connected to angle members 342' and 343 which are secured on the backs of magazines 338 and 339 respectively.

By referring to Figures 3 and 18 it is seen that magazine 338 has an adjustable angle 344 secured thereto by any suitable means such as bolts 345 and 346 which penetrate slots 347 and 348 respectively. Magazine 339 has a similar angle 349 secured to the side thereof by any suitable means such as bolts 350 and 351 which penetrate suitable slots in magazine 339, not shown, but which are identical in all respects to the slots 347 and 348, shown in Figure 18. By providing angles of this type on the magazine, it is evident that harnesses may be removed from the magazine and the angle members 344 and 349 moved inwardly to cause the remaining harnesses to fit properly within the magazines. Magazine 339 is mounted on shaft 359 which shaft is adjustably mounted in a bearing 360 by any suitable means such as set screw 361. By manipulating set screw 361 the angularity of the magazine 339 may be adjusted. Magazine 338 is mounted on a similar shaft 362 which, in turn, is adjustably mounted in a bracket 363 by means of a set screw 364. The angularity of this magazine 338 may likewise be determined by manipulating the set screw 364 (Fig. 3).

The left-hand end of shaft 362 penetrates a lever 365 and has pins 366 and 367 disposed on opposed sides of said lever. Lever 365 is pivoted as at 368 to a bracket 369 which, in turn, is secured to side frame 11. When it is desired to remove a magazine from the loom, set screw 364 is loosened and lever 365 is operated to pull the magazine 338 far enough to the left to remove a harness frame from the magazine. One end of treadles 370 to 375 inclusive, are pivotally mounted on bolt 285 and the lower end of these treadles are operated by rows of cams 376 to 381 inclusive, respectively, in pattern drum 382. This pattern drum is practically identical to pattern drum 265 which has been previously described, except that it is fixedly mounted upon sleeve 108 instead of being mounted on shaft 98. Each of the treadles 370 to 375 inclusive has a roller 284 as shown in Figure 11 on the upper edge thereof which contacts the rows of cams 376 to 381 inclusive. Treadles 370 to 375 inclusive also have vertically disposed links 384 to 389 inclusive which project upwardly and have their upper ends secured on the central portion of lever arms 390 to 395 inclusive, respectively. Links 384 to 389 inclusive are identical to the links 300 as shown in Figure 11, and a further showing of these levers is not deemed necessary. Lever arms 390 to 395 inclusive have pivotally secured on the end thereof links 396 to 401 inclusive respectively, which are similar in structure to link 312 as shown in Figures 11, 3 and 3A. The upper end of these links 396 to 401 inclusive, are secured to the jack stick of harnesses 402, 403, 404, 405, 406, and 407 respectively. The means for making this connection are identical to that shown in Figures 3 and 3A.

Bracket 416 is secured to the upper portion of strut 14 (Fig. 4) by any suitable means such as bolt 417. This bracket has pivotally mounted therein, as at 418, a lever 419 which extends to the right as shown in Figure 4, and contacts a cam 420 which is fixedly secured on pick shaft 55. The right-hand end of lever 419 has secured thereto, as at 421, a connecting link 422 which projects upwardly and is secured to a selvedge harness 423. Secured to the upper portion of selvedge harness 423 is a cable 424 which is mounted on roller 425 which is rotatably mounted in the upper portion of magazine 338, as at 426. The other end of cable 424 is secured to the upper portion of a second selvedge harness 427 and the lower edge of this harness has secured thereto a cable 428 which extends downwardly and is connected to the upper end of a suitable tension spring 429, said tension spring having its lower end secured to bracket 430 which, in turn, is secured to end wall 11 by any suitable means such as bolts or rivets 431. The means for operating the other side of selvedge harness is identical in all respects as is shown in Figures 4 and 2A, and a detailed description will not be made, but like reference characters will be given like parts with the prime notation added.

In ordinary weaving, when an end breaks, it is impossible to stop the loom exactly at that time but the harnesses oscillate several times before the machine comes to a final stop. When this is done the pick of the shuttle thread is lost and the machine must be reversed or backed up a small amount in order that the pick may be found. The mechanism for performing this operation in this invention will be presently described.

One end of a longitudinal shaft 441, (Figs. 2 and 2A and 5 to 8 inclusive), is rotatably mounted in bearing 442, this bearing 442 being secured to the side frame 11 by any suitable means such as bolts 443. Other portions of this shaft 441 are also rotatably mounted in bearings 444 and 445 which are, in turn, secured to the upper portion of frame 64 by any suitable means such as stud bolts 446 and 447 respectively. The other end of this shaft is mounted in a similar manner in bearings 442', 444', and 445', which are identical to the bearings just described, and are secured to end frame 10, and frame 64'. Mounted on the ends of shaft 441 are hand wheels 448 and 448' which are used to rotate the shaft when it is desired to operate the cams 449 and 449' which are fixedly secured on shaft 441. It is seen by referring to Figures 5, 6, 7, and 8, that when the hand wheels 448 and 448' are rotated and the high side of the cam 449 engages the lower left-hand end of levers 95, 151, 165, and 186, that the end of all of the levers will be disengaged from the ratchet wheels 97 and 167. This will leave the shaft 98 free to be rotated by the means described as follows: A ratchet wheel 450 (Figs. 4 and 2A), is fixedly secured on shaft 98 and comprises a double ratchet wheel with teeth pitched in opposite directions. These ratchet wheels are denoted by the reference characters 451 and 452 (Figs. 4 and 14). A pointed lever 453 is adapted to engage teeth in ratchet 451 and this lever extends to the right in Figure 4, and is pivotally secured as at 454 to a vertically disposed lever 455 which is rotatably mounted on shaft 59. Another hooked lever 456 (Fig. 14) is adapted to engage the ratchet 452 and this lever likewise extends to the right and is secured as at 454 to lever 455.

Lever 455 extends upwardly and rests in an indentation in the slot 456 which is formed in the outstanding leg 457 of bearing 353. The lever is shown in Figures 14 and 15, in inoperative position, and in this position, neither of the levers 453 nor 456 engage a ratchet. Lever 455 has pivoted to the side thereof as at 458, a bell crank 459, the vertical legs of bell crank 459 normally resting in a cavity in bracket 460. Bracket 460 is secured to the side of lever 455 and it is seen that this bracket has three cavities in the side thereof in which the vertical leg of bell crank 459 may rest. For example, if the vertical leg of bell crank 459 should rest in indentation 461 the horizontal leg of the bell crank would be raised, whereas, the reverse would be true should the vertical leg rest in indentation 462. The horizontal leg of bell crank 459 (Fig. 14) has a vertical rod 463 penetrating the end thereof and a spring 464 is disposed around rod 463 above the horizontal leg which is confined thereon by any suitable means such as a nut 465. A similar spring 467 is held in contact with the lower portion of the horizontal leg by means of a nut 468. The lower end of link 463 (Fig. 17), is pivoted as at 470 to a horizontally disposed bar 471, said bar 471 being pivotally mounted as at 472 on projection 473 which is integral with lever 455. Since the ends of bar 471 penetrate the levers 453 and 456, it is evident that when the vertical leg of bell crank 459 is moved to notch 461 that the link 463 will be raised thereby raising the left-hand end of member 471 (Fig. 17) to cause the hooked member 456 to be raised upwardly and the pointed member 453 to be lowered to engage the ratchet 451. This will allow the operator to operate the ratchet 451 and to cause the shaft 98 to be rotated in a counterclockwise manner in Figure 4. If it is desired to rotate the shaft in a clockwise manner, the vertical leg of bell crank 459 will be moved to indentation 462 thereby lowering the link 463 and causing the hooked member 456 to engage the ratchet member 452, while the pointed member 453 is in elevated position. It is evident that when the lever 455 is operated with member 456, in lowered position, that the shaft 98 may be rotated in a clockwise manner (Fig. 14). It is therefore seen that means have been provided whereby the other portions of the machine may be rendered inoperative while the shaft 98 is turned in either direction to find the pick of the loom.

The operation of the invention

Crankshaft 51 is constantly rotated which rotates the pick shaft 55 through pinions 53 and 54. The pick shaft, in turn, rotates the eccentric 59 through the pinions 56 and 57, and it is seen that the eccentric shaft 59 also rotates constantly thereby oscillating the eccentric boxes 78 and 84. The levers 95, 151, 165, and 186 which are pivotally mounted on bolt 92 which is connected to the eccentric boxes 78 and 84, have the end nearest the observer in Figure 2A, normally contacting pattern chain 133. The method in which the pattern chain 133 operates the levers 95, 151, 165, and 186 has been fully described in the foregoing specification and a repetition here is not deemed necessary.

Since the pattern chain 133 is mounted on the sprocket 199 and this sprocket is fixedly mounted on shaft 200, the shaft 200 will have to be rotated in order to rotate the pattern chain 133. The ratchet wheel 253 is also fixedly secured on shaft 200 and is operated by lever 254 which lever is connected to another lever 256. Since this lever contacts cam 260 it is seen that lever 254 oscillates back and forth two times, each time the eccentric shaft 59 makes a complete revolution. If the end of lever 254 is in lowered position the ratchet wheel 253 and pattern chain 133 will be advanced one notch, if it is not down due to the fact that the left-hand end of lever 214 is held upwardly by a roller 135, (Figs. 1A and 2A), the lever will oscillate but will not engage the ratchet wheel 253, therefore, the pattern chain 133 will remain stationary until the left-hand end of lever 214 in Figure 2A is caused to move downwardly by means of a roller 231 on the multiplying chain 229.

The multiplying chain 229 controls the pattern chain 133 and each time a roller 231 moves beneath the right-hand end of lever 214 the lever 254 is caused to engage the ratchet wheel 253 and to advance the pattern chain 133 one notch. The left-hand ends of levers 95, 151, 165, and 186 as seen in Figures 5 to 8 inclusive, normally operate the ratchets 97 and 167, the ratchet 97 being adapted to be rotated in a clockwise manner and ratchet 167 being adapted to rotate in a counterclockwise manner. The manner in which the ratchets are operated depends entirely upon whether a roller is disposed beneath the other end of the levers 95, 151, 165, or 186.

The levers 95 and 128 control the clockwise motion of the shaft 98, the levers 186 and 196 control the counterclockwise rotation of shaft 98, and the levers 151 and 165 control the rocker motion of the shaft 98.

It is evident that when shaft 98 is caused to rotate or to oscillate that the pattern drum 265 will move likewise since it is fixedly secured on the shaft. The parts shown in Figure 2 are identical to the parts shown in Figure 2A which control the pattern mechanism except that the pattern drum 382 and the ratchet wheels 97' and 167' are mounted on a sleeve 108 which will allow the pattern drum 382 to move independently of the pattern drum 265.

With the parts in the positions shown in Figures 6 and 7, it has already been described that an oscillatory motion will be imparted to shaft 98 or sleeve 108, or both, depending upon the pattern desired. Therefore, if a one pick cam 267, (Fig. 11), is engaging the roller 284, then roller 284 will ride back and forth from the low portion of the cam 267 to the high point and thus cause shedding for ordinary weaving until a pattern change takes place for other types of weaving and oscillation of shaft 98 or sleeve 108, or both, is stopped, and rotation of shaft 98 or sleeve 108, or both, is effected.

It is therefore seen that nine combinations of rotations may be obtained in pattern drums 382 and 265, namely, (1) clockwise motion of both pattern drums 265 and 382; (2) counterclockwise motion of both drums 265 and 382; (3) clockwise motion of drum 265 and counterclockwise motion of drum 382; (4) counterclockwise motion of drum 382; (5) clockwise motion for drum 265 and rocker motion for drum 382; (6) counterclockwise motion for drum 265 and rocker motion for drum 382; (7) clockwise motion for drum 382 and rocker motion for drum 265; (8) counterclockwise motion for drum 382 and rocker motion for drum 265; (9) rocker motion for both drums 265 and 382.

In the present instance there are twelve rows of cams mounted in the pattern drums 265 and 382, namely, 376 to 381 and 272 to 277 which operate their respective harnesses. By referring to Figure 11 the construction of the pattern drum can be seen, and it will be noticed that the various cams may be placed at any desired position. With the cams 267 to 271 inclusive, disposed at different positions in the different rows, together with the various combinations of rotations of the pattern drums, it is evident that almost any number of combinations may be produced in the shed of the loom. This arrangement eliminates a long pattern chain which is very often several hundred links long, that has heretofore been used and has occupied a great amount of floor space. A pattern drum is substituted therefor which is compact and which is operated by a very short chain. Since the harnesses are connected to the treadles by rigid means, it is seen that the sheds will be absolutely accurate and will not vary after they have once been set up, due to cords, connectors and the like, which will vary in length from day to day, on account of temperature, humidity and wear.

In the drawings and specification, there has been set forth a preferred embodiment of the invention, and although specific terms are employed, they are used in a generic and descriptive sense only, and not for purposes of limitation, the scope of the invention being set forth in the appended claims.

We claim:

1. In a loom having a plurality of harnesses, means for selectively positioning said harnesses to form sheds comprising a pattern drum for controlling the positioning of said harnesses, means for advancing said pattern drum, means for reversing said pattern drum and means for oscillating said pattern drum.

2. In a loom having a plurality of harnesses through which the warp is passed, means for selectively positioning said harnesses to form sheds in the warp, a pattern drum for controlling the positioning of said harnesses, means for advancing said pattern drum, means for reversing the direction of travel of said pattern drum, and means for oscillating said pattern drum.

3. In a loom having a plurality of harnesses through which the warp is passed, means for selectively positioning said harnesses to form sheds in the warp, a pattern drum controlling the positioning of said harnesses, means for advancing said pattern drum, means for reversing the direction of travel of said pattern drum, means for oscillating said pattern drum, and a pattern chain controlling the means for advancing, the means for reversing and the means for oscillating said pattern drum.

4. In a loom having a plurality of harnesses through which the warp is passed, means for selectively positioning said harnesses to form sheds in the warp, a pattern drum controlling the positioning of said harnesses, means for advancing said pattern drum, means for reversing the direction of travel of said pattern drum, means for oscillating said pattern drum, and a pattern chain controlling the means for advancing, the means for reversing, means for oscillating said pattern means and a third pattern means for controlling the second pattern means.

5. In a loom having a plurality of harnesses through which the warp is passed, means for selectively positioning said harnesses to form sheds in the warp comprising a rotary pattern drum, means for advancing said pattern drum, means for oscillating said pattern drum, means for reversing said pattern drum and a pattern chain controlling both means for advancing and reversing the pattern drum.

6. In a loom having a plurality of harnesses through which the warp is passed, means for selectively positioning the harnesses to form sheds in the warp comprising a pattern drum, means for advancing said pattern drum, means for reversing said pattern drum, means for oscillating said pattern drum, and pattern chain controlling the means for advancing, reversing and oscillating the said pattern drum.

7. In a loom having a plurality of harnesses through which the warp is passed, means for selectively positioning said harnesses to form sheds in the warp comprising a pattern drum, a plurality of pawls mounted for reciprocatory movement in the loom for imparting rotation to the pattern drum, means for imparting reciprocatory motion to said pawls and a pattern chain for controlling engagement of said pawls with the means for imparting rotation to the pattern drum.

8. In a loom having a plurality of harnesses, means for selectively positioning said harnesses to form sheds and comprising a pattern drum for controlling the positioning of said harnesses, a pattern chain for controlling the pattern drum, and means for oscillating said pattern drum.

EUGENE P. FLOYD.
ARTHUR G. HACKNEY.